US011996215B2

(12) United States Patent
Lafreniere et al.

(10) Patent No.: US 11,996,215 B2
(45) **Date of Patent: *May 28, 2024**

(54) LOW-PROFILE CABLE ARMOR

(71) Applicant: AFC Cable Systems, Inc., New Bedford, MA (US)

(72) Inventors: Peter Lafreniere, Mattapoisett, MA (US); Stephen Lundgren, Marion, MA (US); Paulo Damoura, Dorchester, MA (US); Ronald Pegg, New Bedford, MA (US); Antonio Araujo, New Bedford, MA (US); David Campbell, Bristol, RI (US)

(73) Assignee: APC Cable Systems, Inc., New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,999

(22) Filed: Aug. 17, 2023

(65) Prior Publication Data

US 2023/0395284 A1 Dec. 7, 2023

Related U.S. Application Data

(63) Continuation of application No. 17/699,349, filed on Mar. 21, 2022, which is a continuation of application No. 17/408,629, filed on Aug. 23, 2021, now Pat. No. 11,282,619, which is a continuation of application No. 16/578,842, filed on Sep. 23, 2019, now Pat. No. 11,101,056.

(51) Int. Cl.
*H01B 7/22* (2006.01)
*H01B 7/04* (2006.01)

(52) U.S. Cl.
CPC ............... *H01B 7/226* (2013.01); *H01B 7/04* (2013.01)

(58) Field of Classification Search
CPC ....... H01B 7/226; F01B 13/1816; F16L 11/16
See application file for complete search history.

(56) References Cited

U.S. PATENT DOCUMENTS

| | | | |
|---|---|---|---|
| 1,134,119 | A | 4/1915 | Gilson |
| 1,215,365 | A | 2/1917 | Gilson |
| 1,819,175 | A | 8/1931 | Edward |
| 1,908,063 | A | 5/1933 | Schneider |
| 2,454,625 | A | 11/1948 | Bondon |
| 2,713,318 | A | 7/1955 | Paulstich |

(Continued)

FOREIGN PATENT DOCUMENTS

EP 0595535 A1 5/1994

*Primary Examiner* — Chau N Nguyen
(74) *Attorney, Agent, or Firm* — KDW FIRM PLLC

(57) ABSTRACT

Disclosed is an armored cable assembly which may include a plurality of conductors and a metal sheath disposed over the plurality of conductors. The metal sheath may have a plurality of revolutions extending helically along a lengthwise axis, each of the plurality of revolutions including a first section having a curved profile, a second section extending from the first section, the second section having a planar profile, and a third section extending from the second section. The third section may include a free end angled towards an interior cavity of the metal sheath, the free end extending past a plane defined by a bottom most point of the first section of an adjacent revolution, the plane extending perpendicular to the second section.

6 Claims, 4 Drawing Sheets

(56) References Cited

U.S. PATENT DOCUMENTS

| | | | | |
|---|---|---|---|---|
| 2,713,381 | A * | 7/1955 | Seck | B29D 23/001 156/143 |
| 2,789,811 | A | 4/1957 | Campbell | |
| 3,311,133 | A | 3/1967 | Kinander | |
| 3,330,303 | A | 7/1967 | Fochler | |
| 3,369,153 | A | 2/1968 | Arnold | |
| 3,930,419 | A | 1/1976 | Kramer | |
| 4,282,398 | A | 8/1981 | Solomon | |
| 4,733,629 | A * | 3/1988 | Hunt | B29C 66/43 114/357 |
| D326,257 | S | 5/1992 | Lee | |
| 5,189,719 | A | 2/1993 | Coleman | |
| D337,309 | S | 7/1993 | Mally | |
| 5,250,930 | A | 10/1993 | Yoshida | |
| 5,259,418 | A | 11/1993 | Hamrick | |
| 5,329,605 | A | 7/1994 | Wargotz | |
| 5,350,885 | A | 9/1994 | Falciglia | |
| 5,600,098 | A | 2/1997 | Kazaks | |
| D380,197 | S | 6/1997 | Garcia | |
| 5,708,235 | A | 1/1998 | Falciglia | |
| 5,739,472 | A | 4/1998 | Buck | |
| 6,009,909 | A * | 1/2000 | Mantua | F02M 35/10137 138/121 |
| 6,034,329 | A | 3/2000 | Kawamura | |
| 6,127,632 | A | 10/2000 | Oswald | |
| 6,140,584 | A | 10/2000 | Baldissara | |
| 6,255,592 | B1 | 7/2001 | Pennington | |
| 6,274,813 | B1 | 8/2001 | Houte | |
| D489,336 | S | 5/2004 | Kitamura | |
| 6,792,828 | B2 | 9/2004 | Ishihara | |
| 6,825,418 | B1 | 11/2004 | Dollins | |
| D506,444 | S | 6/2005 | Nakamura | |
| 6,906,264 | B1 * | 6/2005 | Grant, Jr. | H02G 3/0468 174/102 R |
| D510,727 | S | 10/2005 | Pang | |
| 6,998,538 | B1 | 2/2006 | Fetterolf, Sr. | |
| D519,931 | S | 5/2006 | Van Haaster | |
| D530,671 | S | 10/2006 | Reed | |
| 7,205,480 | B2 | 4/2007 | Fetterolf, Sr. | |
| 7,420,120 | B2 | 9/2008 | Vertente | |
| D580,864 | S | 11/2008 | Richmond | |
| 7,465,878 | B2 | 12/2008 | Dollins | |
| D588,997 | S | 3/2009 | Hunt, Sr. | |
| 8,088,997 | B2 | 1/2012 | Picard | |
| 8,278,554 | B2 | 10/2012 | Dollins | |
| D682,222 | S | 5/2013 | Crucitti | |
| D729,176 | S | 5/2015 | Herring | |
| D729,177 | S | 5/2015 | Baldwin | |
| D760,667 | S | 7/2016 | Grote | |
| D777,680 | S | 1/2017 | Chia | |
| D778,242 | S | 2/2017 | Chia | |
| 9,576,702 | B2 | 2/2017 | Wobick | |
| D818,966 | S | 5/2018 | Paterson | |
| D820,786 | S | 6/2018 | Fawcett | |
| 10,002,689 | B2 | 6/2018 | Straniero | |
| D826,866 | S | 8/2018 | Fawcett | |
| D836,558 | S | 12/2018 | Paterson | |
| 10,431,353 | B2 | 10/2019 | Straniero | |
| 10,468,159 | B1 | 11/2019 | Duan et al. | |
| D920,259 | S | 5/2021 | Duggan | |
| 11,101,056 | B1 * | 8/2021 | Lafreniere | H01B 7/226 |
| D935,731 | S | 11/2021 | Lafreniere | |
| D936,610 | S | 11/2021 | Grabowski | |
| D936,611 | S | 11/2021 | Grabowski | |
| D947,133 | S | 3/2022 | Byme | |
| 11,282,619 | B2 | 3/2022 | Lafreniere et al. | |
| D953,276 | S | 5/2022 | Chen | |
| 11,587,699 | B2 * | 2/2023 | Lafreniere | H02G 3/0468 |
| 2013/0056105 | A1 | 3/2013 | Graham | |
| 2013/0240237 | A1 | 9/2013 | Lundgren | |
| 2014/0238718 | A1 | 8/2014 | Tanner | |
| 2022/0044841 | A1 | 2/2022 | Lafreniere | |

* cited by examiner

LOW-PROFILE CABLE ARMOR

CROSS-REFERENCE TO RELATED APPLICATION

This is a continuation application of U.S. patent application Ser. No. 17/699,349, filed on Mar. 21, 2022, which is a continuation application of U.S. patent application Ser. No. 17/408,629, filed on Aug. 23, 2021, now U.S. Pat. No. 11,587,699, which is a continuation application of U.S. patent application Ser. No. 16/578,842, now U.S. Pat. No. 11,101,056, filed on Sep. 23, 2019, the entirety of which applications are incorporated by reference herein.

BACKGROUND OF THE DISCLOSURE

Field of the Disclosure

The present disclosure relates generally to armored cables. More particularly, the present disclosure relates to a low-profile armored cable assembly.

Discussion of Related Art

Armored cable ("AC") and Metal-Clad ("MC") cable provide electrical wiring in various types of construction applications. The type, use and composition of these cables should satisfy certain standards as set forth, for example, in the National Electric Code® (NEC®). (National Electrical Code and NEC are registered trademarks of National Fire Protection Association, Inc.) These cables house electrical conductors within a metal armor. The metal armor may be flexible to enable the cable to bend while still protecting the conductors against external damage during and after installation. The metal armor which houses the electrical conductors may be made from steel or aluminum, copper-alloys, bronze-alloys and/or aluminum alloys. Typically, the metal armor is formed from strip steel, for example, which is helically wrapped to form a series of interlocked sections along a longitudinal length of the cable. Alternatively, the sheaths may be made from smooth or corrugated metal.

While installing MC cable, the product may be run through wooden or metal studs. Prior art armor profiles are often more pronounced, with deeper and wider valleys between peaks. This construction often causes the cable to get hung up on the studs, requiring readjustment of the cable while installing. Furthermore, prior art cables cause excessive hang ups while being routed through the stud. A need therefore exists for an armored cable that addresses at least some of the above issues.

SUMMARY OF THE DISCLOSURE

Exemplary approaches provided herein are directed to an armored cable assembly. In one approach, an armored cable assembly may include a plurality of conductors and a metal sheath disposed over the plurality of conductors. The metal sheath may have a plurality of revolutions extending helically along a lengthwise axis, each of the plurality of revolutions including a first section having a curved profile, a second section extending from the first section, the second section having a planar profile, and a third section extending from the second section. The third section may include a free end angled towards an interior cavity of the metal sheath, the free end extending past a plane defined by a bottom most point of the first section of an adjacent revolution, the plane extending perpendicular to the second section.

In another approach, a metal-clad (MC) cable assembly may include a plurality of conductors, and a metal sheath comprising a metal strip wound around the plurality of conductors in a series of helical revolutions. Each of the helical revolutions may include a first section having a semicircle profile, a second section extending from the first section, the second section having a planar profile, and a third section extending from the second section, the third section including a free end angled towards an interior cavity of the metal sheath, the free end extending past a plane defined by a bottom most point of the first section of an adjacent revolution, the plane extending perpendicular to a surface of the second section.

In yet another approach, a metal sheath for protecting one or more conductors may include a plurality of interlocking revolutions extending helically along a lengthwise axis. Each of the plurality of interlocking revolutions may include a first section having a curved profile, a second section extending from the first section, the second section having a planar profile, and a third section extending from the second section, the third section including a free end angled towards an interior cavity of the metal sheath, the free end extending past a plane defined by a bottom most point of the first section of an adjacent revolution, the plane extending perpendicular to the second section.

BRIEF DESCRIPTION OF THE DRAWINGS

The accompanying drawings illustrate exemplary approaches of the disclosed armored cable assembly so far devised for the practical application of the principles thereof, and in which.

Figure 1:
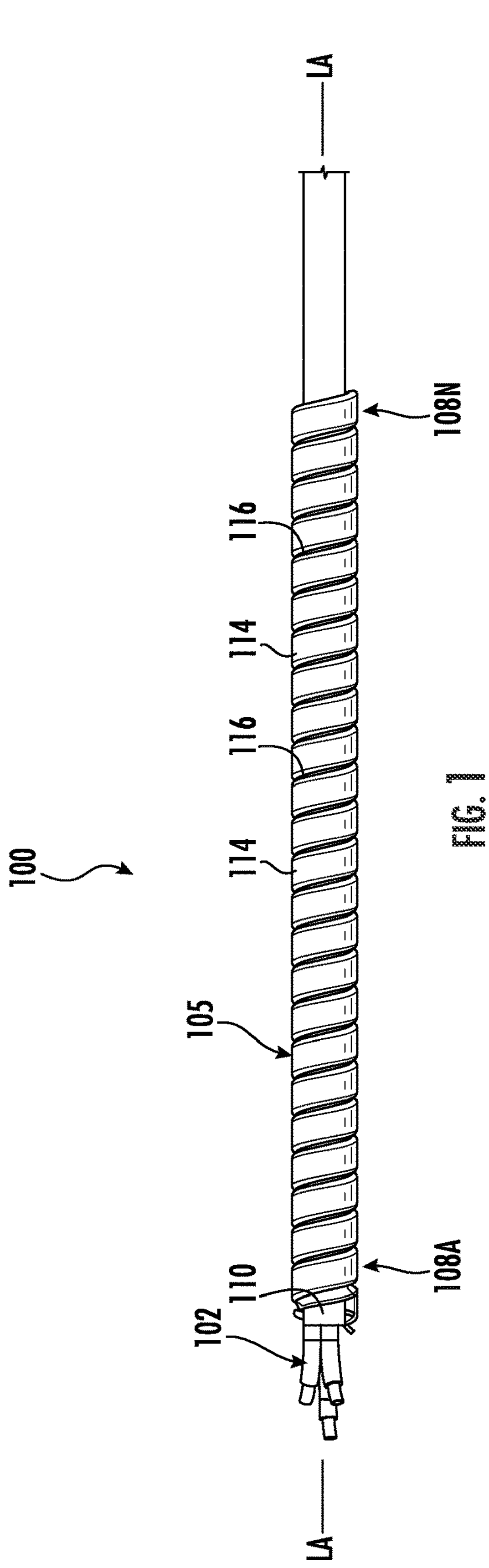
FIG. 1 is a side view of an armored cable assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed armored cable assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, embodiments of the present disclosure provide a novel armor profile that is relatively flat. The flat profile allows cables installers to more easily pull cable through, studs, cable trays, supports, etc., and with less hang ups. Furthermore, the cable doesn't nest into the other cables or itself, and less tangles are likely, for example, when pulling two or more cables. The flat profile further allows for easier uni-directional pulling installation. Cables having the armor profile of the present disclosure have a smaller diameter for packaging, while still meeting performance requirements for MC cables (e.g., minimum crush-resistance and flexibility).

Figure 2:
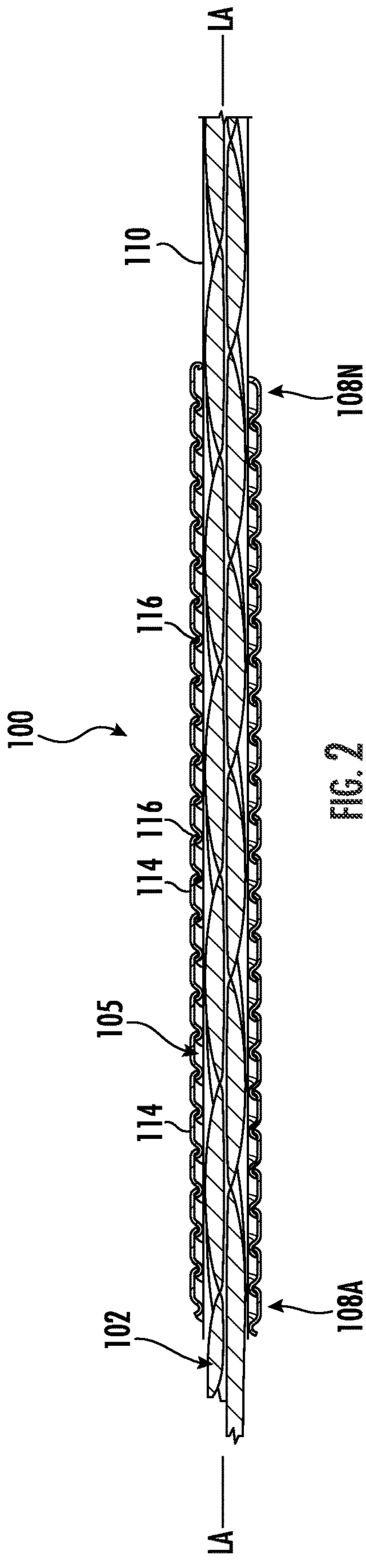
FIG. 2 is a cross-sectional view of the armored cable assembly of FIG. 1 according to embodiments of the present disclosure.

Referring now to the side view of FIG. 1 and to the side cross-sectional view of FIG. 2, an exemplary cable assembly 100 according to an exemplary approach will be described in greater detail. As shown, the armored cable assembly (hereinafter "assembly") 100 may include a plurality of conductors 102 extending either parallel to one another or cabled together, in either a right or left hand lay. The conductors 102 generally extend along a lengthwise axis 'LA' of the assembly 100. The plurality of conductors 102 may be enclosed by a metal sheath 105. Although non-limiting, the assembly 100 may be a Metal-Clad (MC) cable assembly.

The metal sheath 105 may be formed as a seamless or welded continuous sheath, and has a generally circular cross section with a thickness of about 0.005 to about 0.060 inches. The metal sheath 10 may be formed from flat or shaped metal strip, the edges of which are helically wrapped and interlock to form a series of revolutions 108A-108N along the length of the conductors 102. In this manner, the metal sheath 105 allows the resulting assembly 100 to have a desired bend radius sufficient for installation within a building or structure. The metal sheath 105 may also be formed into shapes other than generally circular such as, for example, rectangles, polygons, ovals and the like. The metal sheath 105 provides a protective metal covering around the conductors 102.

The metal sheath 105 may be formed by using an armoring machine to helically wind a metal strip around the conductors 102. The edges of the metal strip interlock to form a series of peaks 114 and valleys 116 along the length of the metal sheath 105, as will be described in greater detail below.

As shown, a binder 110 may be wrapped around the conductors 102. It should be understood that a greater or fewer number of conductors can be utilized and cable the assembly 100 can be utilized without a binder, depending on the particular application in that the assembly 100 is being used.

Although not shown, it will be appreciated that assembly 100 may include one or more filler members within the metal sheath 105. In one approach, a longitudinally oriented filler member is disposed within the metal sheath 105 adjacent to the plurality of conductors 102 to push the plurality of conductors 102 radially outward and into contact with an inside surface of metal sheath 105. The filler member can be made from any of a variety of fiber or polymer materials. Furthermore, the filler member can be used with MC Cable assemblies having any number of insulated conductor assemblies.

Figure 3:
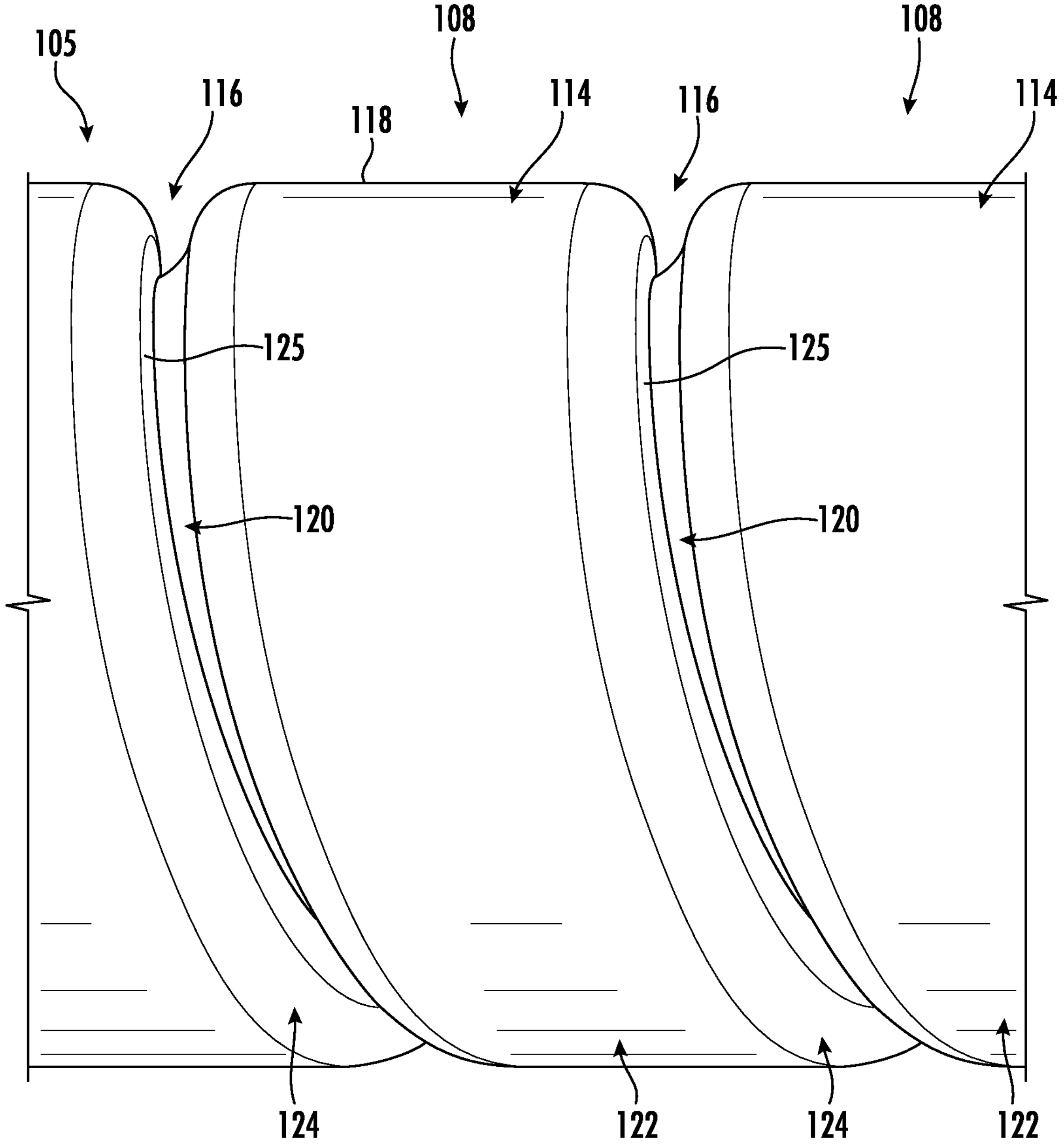
FIG. 3 is a side view of the armored cable assembly of FIG. 1 according to embodiments of the present disclosure.
Figure 4:
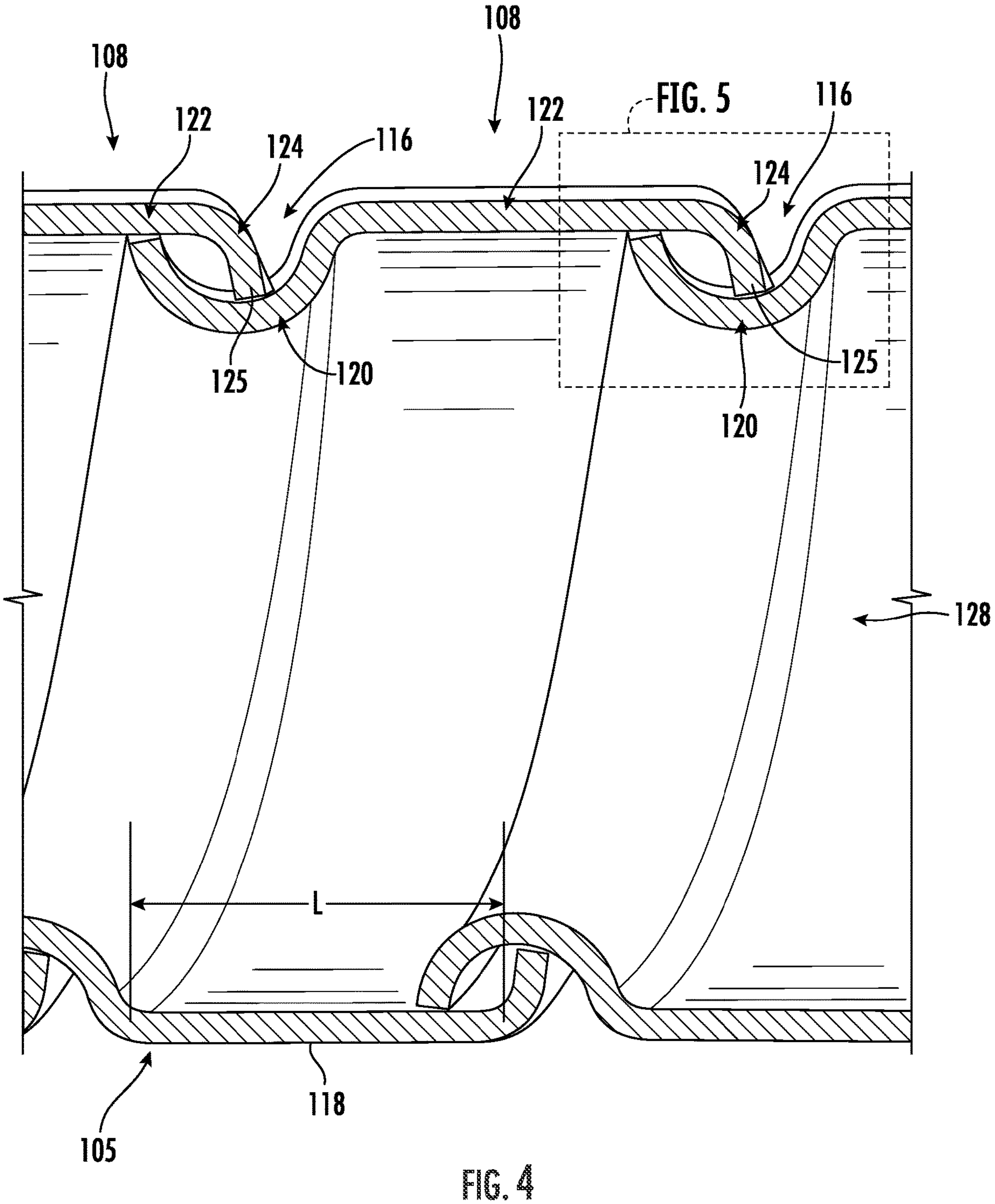
FIG. 4 is a cross-sectional view of the armored cable assembly of FIG. 3 according to embodiments of the present disclosure.

Turning now to FIGS. 3-4, the metal sheath 105 according to embodiments of the present disclosure will be described in greater detail. As shown, the metal sheath 105 may be formed of a metal strip, such as aluminum, having revolutions 108 that overlap or interlock with uniformly spaced peaks 114 and valleys 116 defining an outer surface 118 of the sheath 105. As shown, the revolutions 108 extend helically around the lengthwise axis 'LA' (FIGS. 1-2). In some embodiments, each of the revolutions 108 may include a first section 120 having a curved, radiused, or semicircle profile extending into an interior cavity 128 of the metal sheath 105, and a second section 122 extending from the first section 120. As shown, the second section 122 generally has a planar or flat profile extending along the lengthwise axis. Each of the second sections 122 may generally extend along a same plane when the metal sheath 105 is flat. Furthermore, second sections 122 on circumferentially opposite sides of the metal sheath 105 (e.g., top and bottom) generally extend parallel to one another when the metal sheath 105 is flat. Each of the revolutions 108 may further include a third section 124 extending from the second section 122, the third section including a free end 125 angled towards the interior cavity 128 of the metal sheath 105.

Figure 5:
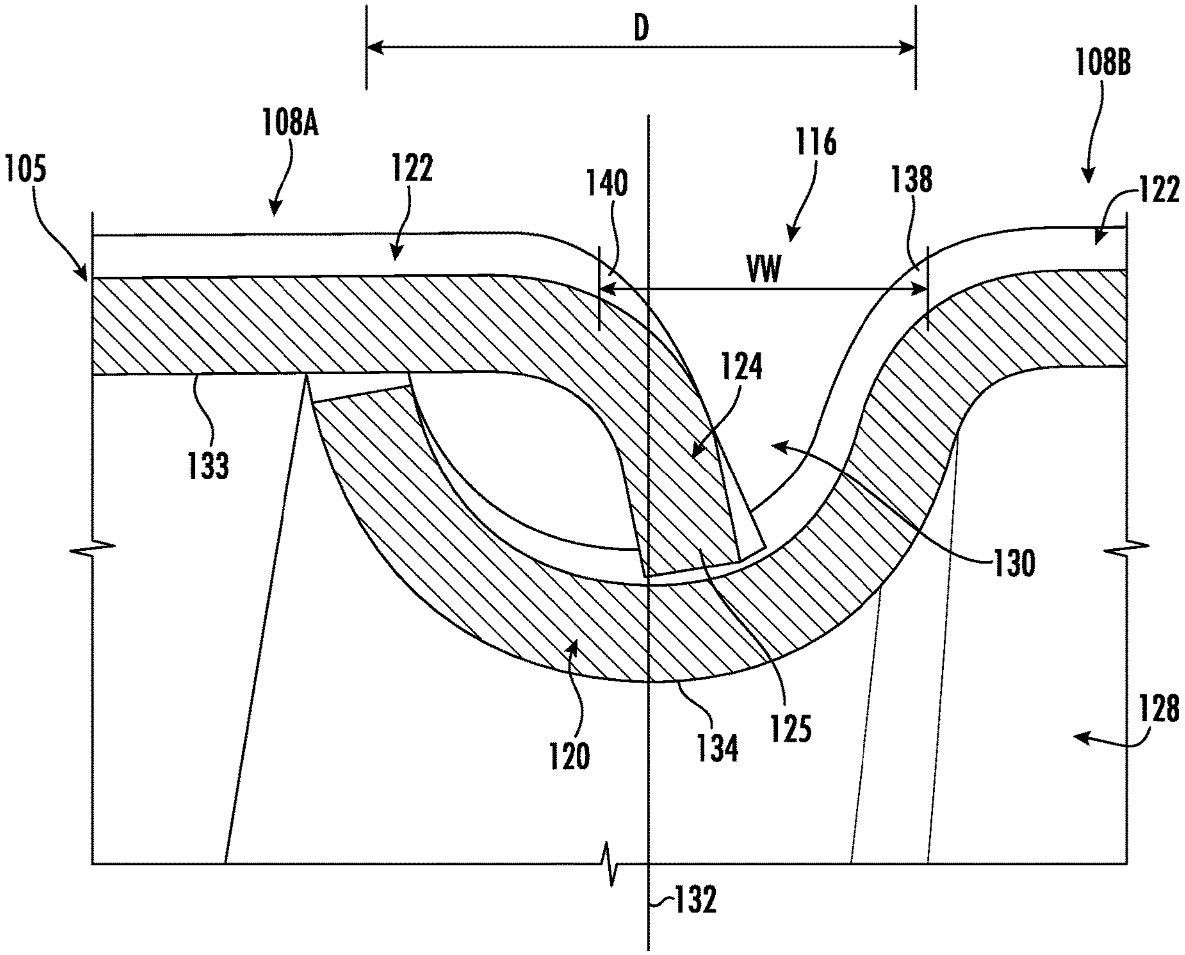
FIG. 5 is a close-up cross-sectional view of a portion of the armored cable assembly of FIG. 4 according to embodiments of the present disclosure.

Turning now to FIG. 5, an exemplary valley 116 of the metal sheath 105 according to embodiments of the present disclosure will be described in greater detail. As shown, the free end 125 of the third section 124 of revolution 108A may terminate within a recess 130 defined by the curved or semicircle profile of the first section 120 of adjacent revolution 108B. As further shown, the free end 125 of the third section 124 may extend towards the interior cavity 128 at a non-zero angle (e.g. between 3-20°) with respect to a plane 132 extending through the first section 120. In other embodiments, the free end 125 may extend towards the interior cavity 128 parallel to the plane 132. As shown, the plane 132 may extend perpendicular to an inner surface 133 of the second section 122 and through a bottom most point 134 of the first section 120.

The valley 116 can be defined by a valley width 'VW', which may be measured from a first inflection point 138 located at an intersection of the first section 120 and the second section 122, and a second inflection point 140 located at an intersection of the second section 122 and the third section 124. In order to prevent excessive hang ups during installation of the assembly 100, it is advantageous to make VW as small as possible relative to the other portions of the metal sheath 105. For example, a length 1' (FIG. 4) of the second section 122, along the lengthwise axis, may be at least three times larger/longer than the VW, and at least one time larger than a diameter Tr of the first section 120. Furthermore, VW may be less than the diameter Tr of the first section 120. To further minimize VW, the free end 125 of the third section 124 may extend past the plane 132 to provide a more compact construction.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A metal sheath for housing a plurality of conductors, the metal sheath comprising a continuous strip of metal having a plurality of revolutions extending along a lengthwise axis, a first revolution of the plurality of revolutions comprising:

a first section having a semicircular profile extending into an interior cavity of the metal sheath;

a second section extending from the first section and parallel to the lengthwise axis, wherein a length of the second section is larger than a diameter of the first section; and a third section extending from the second section, the third section terminating within a recess defined by a semicircular profile of a first section of an adjacent revolution of the plurality of revolutions such that the first revolution and the adjacent revolution interlock, wherein the first section and the second section of the first revolution connect at a first inflection point, wherein the second section and the third section of the first revolution connect at a second inflection point, wherein the adjacent revolution has a second section extending from the first section, wherein the first section and the second section of the adjacent revolution connect at a first inflection point of the adjacent revolution, wherein a distance between the second inflection point of the first revolution and the first inflection point of the adjacent revolution is less than the diameter of the first section of the first revolution when the metal sheath is in a linear configuration, and wherein the length of the second section of the first revolution is at least three times as large as the distance between the second inflection point of the first revolution and the first inflection point of the adjacent revolution when the metal sheath is in the linear configuration.

2. A metal sheath comprising a single, continuous metal strip wound in a series of helical revolutions extending along a lengthwise axis, at least one helical revolution of the series of helical revolutions comprising:

a first section having a semicircular profile extending into an interior cavity of the metal sheath;

a second section extending from the first section, wherein the second section extends parallel to the lengthwise axis, wherein a length of the second section is larger than a diameter of the first section, and wherein the length of the second section is at least 1.5 times as large as the diameter of the first section; and a third section extending from the second section, the third section terminating within a recess defined by a semicircular profile of a first section of an adjacent helical revolution of the series of helical revolutions, wherein the first section and the second section of the at least one helical revolution connect at a first inflection point, and wherein the second section and the third section of the at least one helical revolution connect at a second inflection point.

3. A metal sheath comprising a continuous metal strip wound about a lengthwise axis in a series of convolutions, a first convolution of the series of convolutions comprising:

a first section having a semicircular profile, wherein the semicircular profile is concave relative to the lengthwise axis;

a second section extending from the first section at a first inflection point, the second section extending parallel to the lengthwise axis, wherein a length of the second section is larger than a diameter of the first section, and wherein the length of the second section is at least 1.5 times as large as the diameter of the first section; and a third section extending from the second section at a second inflection point, the third section terminating within a recess defined by a semicircular profile of a first section of an adjacent convolution of the series of convolutions.

4. The metal sheath of claim 3, wherein the adjacent convolution further comprises a second section connected to the first section at a first inflection point of the adjacent convolution.

5. The metal sheath of claim 3, wherein the diameter of the first section of the first convolution is greater than a distance between the second inflection point of the first convolution and the first inflection point of the adjacent convolution.

6. A metal sheath for housing a plurality of conductors, the metal sheath comprising a continuous strip of metal having a plurality of revolutions extending along a lengthwise axis, a first revolution of the plurality of revolutions comprising:

a first section having a semicircular profile extending into an interior cavity of the metal sheath;

a second section extending from the first section, wherein a length of the second section is larger than a diameter of the first section; and a third section extending from the second section, the third section terminating within a recess defined by a semicircular profile of a first section of an adjacent revolution of the plurality of revolutions such that the first revolution and the adjacent revolution interlock, wherein the first section and the second section of the first revolution connect at a first inflection point, wherein the second section and the third section of the first revolution connect at a second inflection point, wherein the adjacent revolution has a second section extending from the first section, wherein the first section and the second section of the adjacent revolution connect at a first inflection point of the adjacent revolution, wherein a distance between the second inflection point of the first revolution and the first inflection point of the adjacent revolution is less than the diameter of the first section of the first revolution when the metal sheath is in a linear configuration, and wherein the length of the second section of the first revolution is at least three times as large as the distance between the second inflection point of the first revolution and the first inflection point of the adjacent revolution when the metal sheath is in the linear configuration.

* * * * *